J. L. WATSON, Sr. & J. L. WATSON, Jr.
FRANGIBLE RECEPTACLE.
APPLICATION FILED MAR. 5, 1909.
939,572. Patented Nov. 9, 1909.
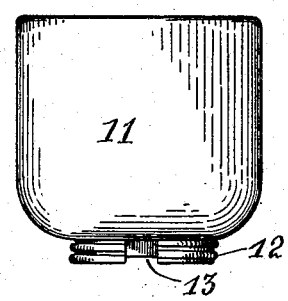
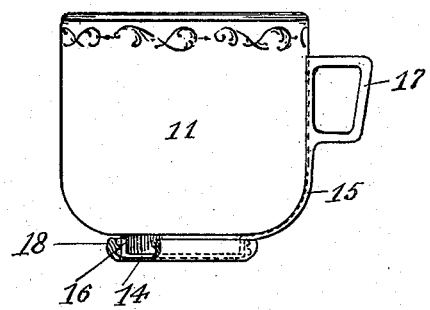
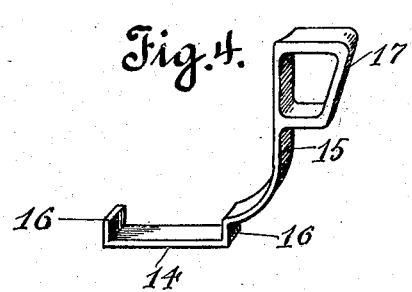
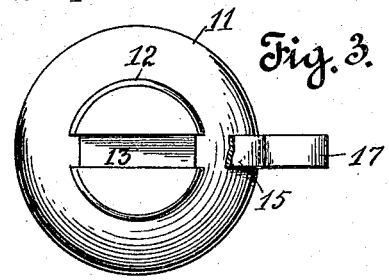
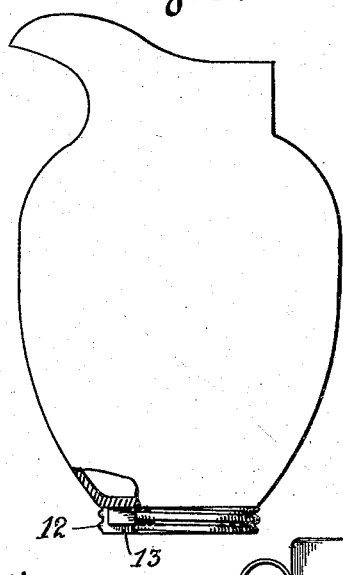
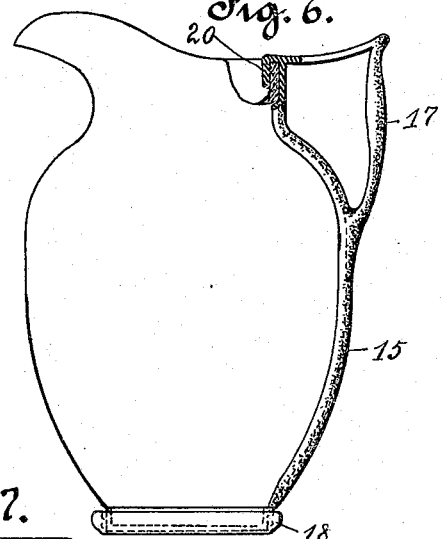
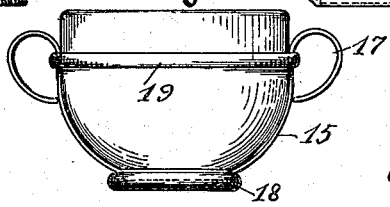
Witnesses.
Inventors,
John L. Watson, Sr.,
John L. Watson, Jr.,
By
Attorney

UNITED STATES PATENT OFFICE.

JOHN L. WATSON, SR., AND JOHN L. WATSON, JR., OF LOS ANGELES, CALIFORNIA.

FRANGIBLE RECEPTACLE.

939,572.  Specification of Letters Patent.  Patented Nov. 9, 1909.

Application filed March 5, 1909. Serial No. 481,378.

*To all whom it may concern:*

Be it known that we, JOHN L. WATSON, Sr., and JOHN L. WATSON, Jr., both citizens of the United States, residing in the city of Los Angeles, county of Los Angeles, and State of California, have invented new and useful Improvements in Frangible Receptacles, of which the following is a specification.

Our invention relates to frangible receptacles principally formed of glass or china ware where a handle is required on the side of the receptacle, and the object thereof is to provide for such receptacle a handle of metal or other non-frangible substance which can be detachably secured to the body of the receptacle without the use of cement or rivets. We accomplish this object in the manner described herein and illustrated in the accompanying drawings, in which;

Figure 1 is a side elevation of an earthenware cup ready to receive the detachable handle. Fig. 2 is a side elevation showing the cup and handle secured together with a portion of the securing ring broken away. Fig. 3 is a bottom plan of Fig. 1 with a part of the handle in place. Fig. 4 is a perspective view of the detachable handle. Fig. 5 is a side elevation of a part of a glass pitcher with a portion of the bottom broken away ready to receive the handle. Fig. 6 is the side elevation with the handle secured thereto. Fig. 7 is the side elevation of a cup with two handles secured thereto.

In practicing our invention the lower or external part 10 of the bottom of cup 11 would preferably be reduced in size as best shown in Fig. 1, and would be provided with external threads 12. A transverse central channel 13 would be provided in the bottom for the reception of the base plate 14 of the handle 15. At each end of channel 13 the lower portion of the bottom of the cup is still further reduced in size so as to receive within the threads on the other portion of the bottom the vertical portions 16 of the base plate of the non-frangible handle. From the base plate upwardly, the handle is of a configuration to snugly fit the side of the cup, and the upper end terminates in a finger loop 17. The handle is secured to the cup by an internally threaded securing ring 18 which is screwed upon the bottom of the cup after the base plate 14 is placed in groove 13 of the cup. When two handles are desired, as in bouillon cups, there would be a finger ring and shank on each side as shown in Fig. 7, and we would also use a band ring 19 around the cup and handles in order to provide a lighter handle. A band ring may also be used in connection with the handle shown in Fig. 2 where a very light handle is desired. Where the handle is used for a pitcher or other large receptacle, we prefer to have a retaining clip 20 secured to the top of the finger loop and projecting over the top edge of the pitcher and down into the inside, as shown in Fig. 6.

By this construction we have shown a cheap and efficient and durable handle which can be quickly secured upon a cup, a glass or pitcher or other receptacle, and which when properly ornamented will add to the beauty of the receptacle on which it is used. When a retaining band like that shown in Fig. 7 is used, the same can be very thin and light and can form a part of the decoration of the receptacle on which it is used. Another advantage in this construction lies in the fact that the handles are practically indestructible, and that if the body of the receptacle becomes broken a new body can be obtained without incurring the expense of a new handle. Another advantage lies in the fact that the handles will be constructed of metal, or other practically indestructible material, so that there is less liability of injury to the handle than if it were of the frangible material.

Having described our invention what we claim is;

1. A frangible body having a bottom portion provided with external threads and a transverse channel, the bottom portion being slightly reduced in size at the channel; a detachable non-frangible handle having a base plate adapted to fit into the channel in the bottom; and a securing ring adapted to be screwed upon the threaded bottom and thereby secure the handle to the body.

2. The combination of a receptacle having a frangible body, said body having a reduced exterior bottom provided with external threads and a transverse channel therein; a detachable non-frangible handle having a base plate adapted to fit into the channel in the bottom; a securing ring adapted to be screwed upon the threaded portion of the bottom and secure the handle to the body.

3. The combination of a receptacle having a body, said body having a reduced exterior bottom portion provided with external threads and a transverse channel therein; a detachable handle having a base plate adapted to fit into the channel in the bottom and a securing clip at the top thereof adapted to fit over the upper edge of the receptacle; and a securing ring adapted to be screwed upon the threaded bottom.

In witness that we claim the foregoing we have hereunto subscribed our names this 27th day of February, 1909.

JOHN L. WATSON, Sr.
JOHN L. WATSON, Jr.

Witnesses:
G. E. HARPHAM,
S. B. AUSTIN.